US012748381B2

(12) United States Patent
Fuji et al.

(10) Patent No.: US 12,748,381 B2
(45) Date of Patent: *Sep. 29, 2026

(54) WATCH COMPONENT, WATCH, AND MANUFACTURING METHOD FOR WATCH COMPONENT

(71) Applicant: SEIKO EPSON CORPORATION, Tokyo (JP)

(72) Inventors: Tsubasa Fuji, Shiojiri (JP); Hikonosuke Uwai, Azumino (JP); Ami Kugimoto, Shiojiri (JP); Ai Yoshinaga, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 608 days.

This patent is subject to a terminal disclaimer.

(21) Appl. No.: 18/191,123

(22) Filed: Mar. 28, 2023

(65) Prior Publication Data

US 2023/0315019 A1 Oct. 5, 2023

(30) Foreign Application Priority Data

Mar. 29, 2022 (JP) ................................ 2022-053344

(51) Int. Cl.
*G04B 45/00* (2006.01)
*G04B 19/12* (2006.01)

(52) U.S. Cl.
CPC ......... *G04B 45/0015* (2013.01); *G04B 19/12* (2013.01)

(58) Field of Classification Search
CPC ........................... G04B 45/0015; G04B 19/12
USPC ......................................................... 359/567
See application file for complete search history.

(56) References Cited

U.S. PATENT DOCUMENTS 3,910,033 A * 10/1975 Saito ...................... G04B 19/12 968/156
5,750,241 A 5/1998 Kobayashi et al.
8,243,556 B2 8/2012 Yamaguchi et al.
10,717,357 B2 7/2020 Mochizuki et al.
2002/0068148 A1* 6/2002 Nakamura .............. C25D 1/10 428/156
2007/0195651 A1 8/2007 Kawakami
2009/0129210 A1* 5/2009 Yamaguchi .......... H10F 77/311 368/205
2010/0060987 A1* 3/2010 Witzman .............. G02B 5/285 427/162

(Continued)

FOREIGN PATENT DOCUMENTS

CN 102540853 A 7/2012
CN 111683562 A 9/2020

(Continued)

*Primary Examiner* — George G. King
(74) *Attorney, Agent, or Firm* — Harness, Dickey & Pierce, P.L.C.

(57) ABSTRACT

A watch component includes a base material including a first region having a surface at which a plurality of recessed portions are formed and a second region having a smooth surface, and a multilayer film configured to cover at least a portion of the base material. When viewed in a cross-sectional view taken along a thickness direction of the base material, the plurality of recessed portions are defined by a first side and a second side that is tilted with respect to the first side and is in contact with the first side at an end portion, and a hue angle of the first region is greater than a hue angle of the second region.

6 Claims, 11 Drawing Sheets

(56) References Cited

U.S. PATENT DOCUMENTS

| | | | | |
|---|---|---|---|---|
| 2012/0140604 | A1 | 6/2012 | Kawakami et al. | |
| 2017/0060093 | A1 | 3/2017 | Awano et al. | |
| 2017/0131684 | A1 | 5/2017 | Cusin et al. | |
| 2018/0217558 | A1 | 8/2018 | Furusato | |
| 2018/0217559 | A1* | 8/2018 | Furusato | G04B 39/00 |
| 2018/0217560 | A1 | 8/2018 | Furusato | |
| 2021/0063968 | A1 | 3/2021 | Furusato | |
| 2021/0124099 | A1 | 4/2021 | Kim et al. | |
| 2023/0315018 | A1* | 10/2023 | Fuji | G04B 45/0015<br>368/232 |

FOREIGN PATENT DOCUMENTS

| | | | | |
|---|---|---|---|---|
| EP | 3591099 | A1 | | 1/2020 |
| EP | 3896191 | A1 | | 10/2021 |
| JP | 2003-108047 | A | | 4/2003 |
| JP | 2005-227047 | A | | 8/2005 |
| JP | 2007-024698 | A | | 2/2007 |
| JP | 2010-185722 | A | | 8/2010 |
| JP | 2017-044554 | A | | 3/2017 |
| JP | 2018032015 | A | * | 3/2018 |
| JP | 2018-124269 | A | | 8/2018 |
| JP | 2021-032803 | A | | 3/2021 |
| JP | 2022-008477 | A | | 1/2022 |

* cited by examiner

WATCH COMPONENT, WATCH, AND MANUFACTURING METHOD FOR WATCH COMPONENT

The present application is based on, and claims priority from JP Application Serial Number 2022-053344, filed Mar. 29, 2022, the disclosure of which is hereby incorporated by reference herein in its entirety.

BACKGROUND

1. Technical Field

The present disclosure relates to a watch component, a watch, and a manufacturing method for the watch component.

2. Related Art

JP-A-2018-124269 discloses a watch component in which a color adjusting film for adjusting color tone is stacked on a substrate, which is a metallic luster part.

In the watch component of JP-A-2018-124269, the exterior color tone is adjusted by the metallic luster part and the color adjusting film so that the aesthetics can be excellent even without using precious metal as the main material.

While JP-A-2018-124269 can provide aesthetics like precious metals, it can only provide the decoration with a single color, and therefore cannot change the hue of the color.

SUMMARY

A watch component of the present disclosure includes a base material including a first region having a surface at which a plurality of recessed portions are formed and a second region having a smooth surface, and a multilayer film configured to cover at least a portion of the base material. When viewed in a cross-sectional view taken along a thickness direction of the base material, the plurality of recessed portions are defined by a first side and a second side, the second side being tilted with respect to the first side and being in contact with the first side at an end portion, and a hue angle of the first region is greater than a hue angle of the second region.

A watch of the present disclosure includes the watch component.

A manufacturing method of the present disclosure is a method for a watch component including a base material including a first region having a surface at which a plurality of recessed portions are formed and a second region having a smooth surface, and a multilayer film configured to cover at least a portion of the base material. The manufacturing method includes forming a plurality of recessed portions at the surface of the first region of the base material, and stacking the multilayer film on at least a part of the surface of the base material. When viewed in a cross-sectional view taken along a thickness direction of the base material, the plurality of recessed portions are defined by a first side and a second side, the second side being tilted with respect to the first side and being in contact with the first side at an end portion.

A watch of the present disclosure includes the watch component manufactured through the manufacturing method for the watch component.

DESCRIPTION OF EXEMPLARY EMBODIMENTS

Embodiments

A watch 1 according to an embodiment of the present disclosure is described below with reference to the drawings.

Figure 1:
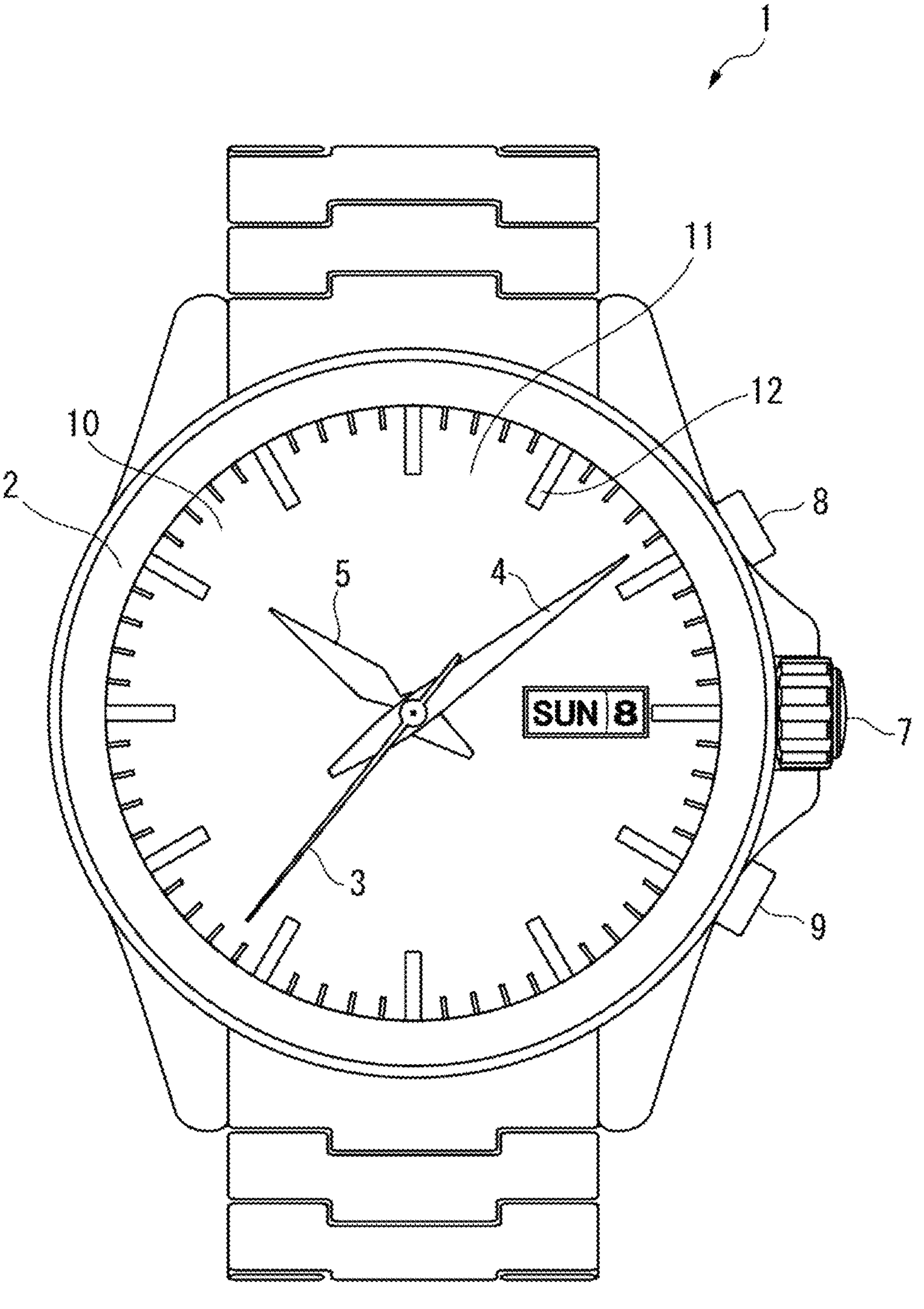
FIG. 1 is a front view illustrating a watch of a first embodiment.

FIG. 1 is a front view illustrating the watch 1. In this embodiment, the watch 1 is configured as a wristwatch worn on the wrist of a user.

As illustrated in FIG. 1, the watch 1 includes a metal case 2. Further, a disk-shaped dial 10, a second hand 3, a minute hand 4, an hour hand 5, a crown 7, an A-button 8 and a B-button 9 are provided inside the case 2. Further, the dial 10 includes a dial body part 11 and an hour mark 12 provided on the dial body part 11. Note that the dial 10 is an example of the watch component of the present disclosure.

Hour Mark

Figure 2:
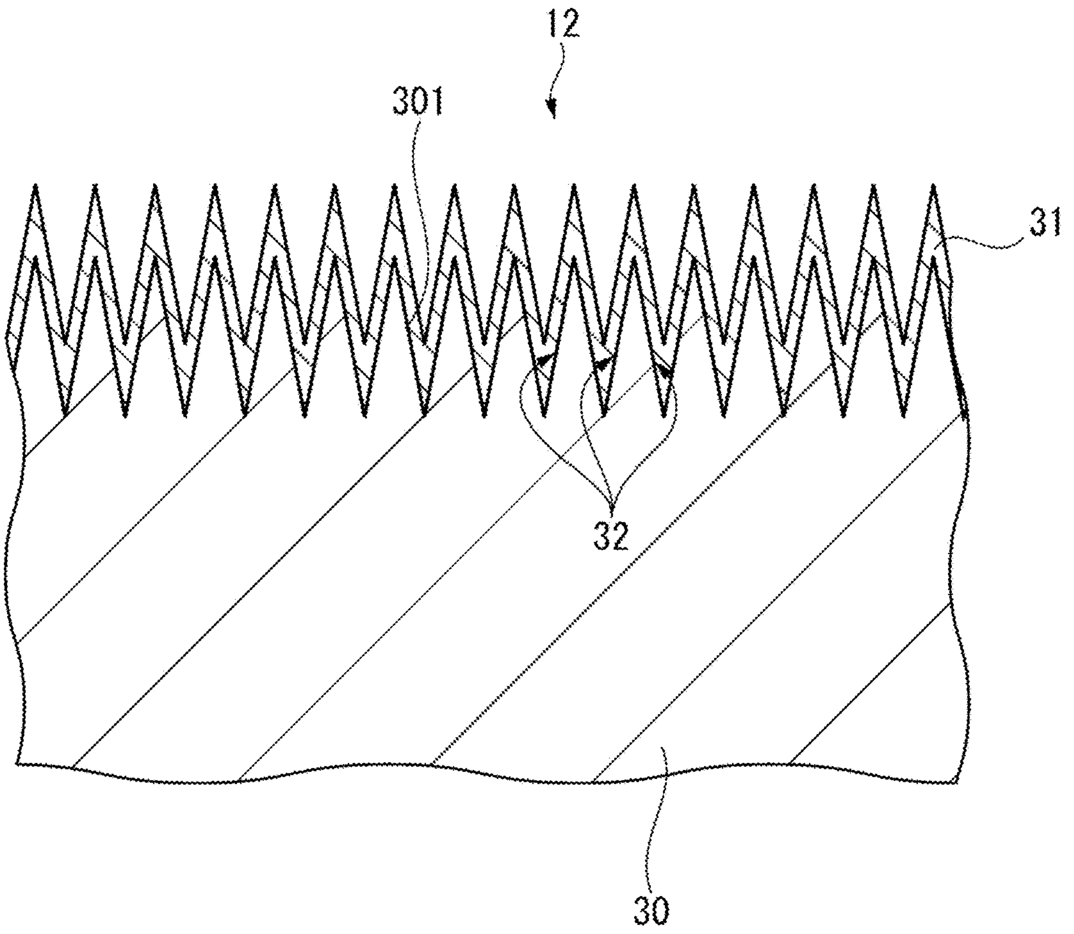
FIG. 2 is a sectional view illustrating a main part of an hour mark of the first embodiment.
Figure 3:
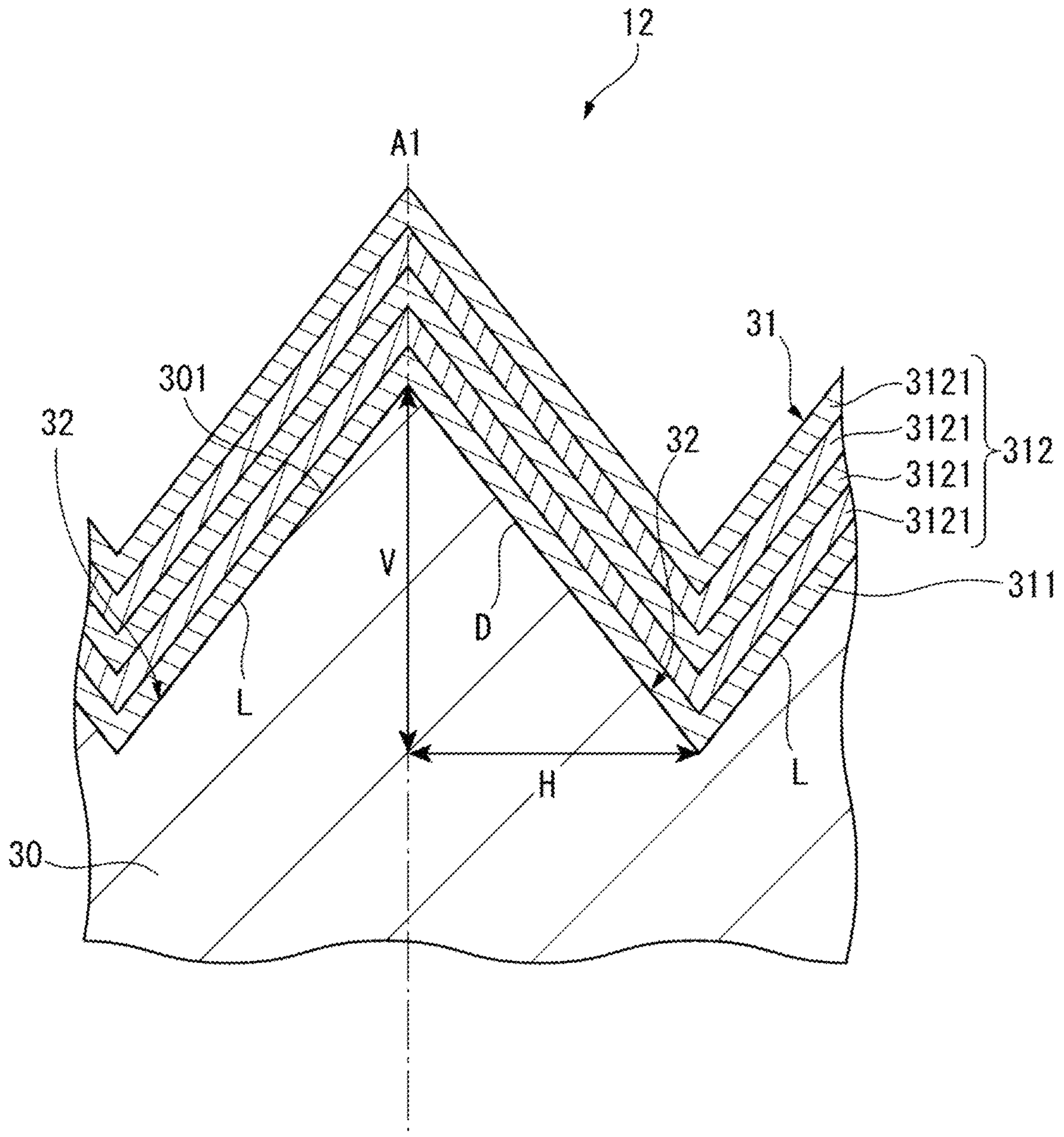
FIG. 3 is an enlarged sectional view illustrating a main part of the hour mark of the first embodiment.
Figure 4:
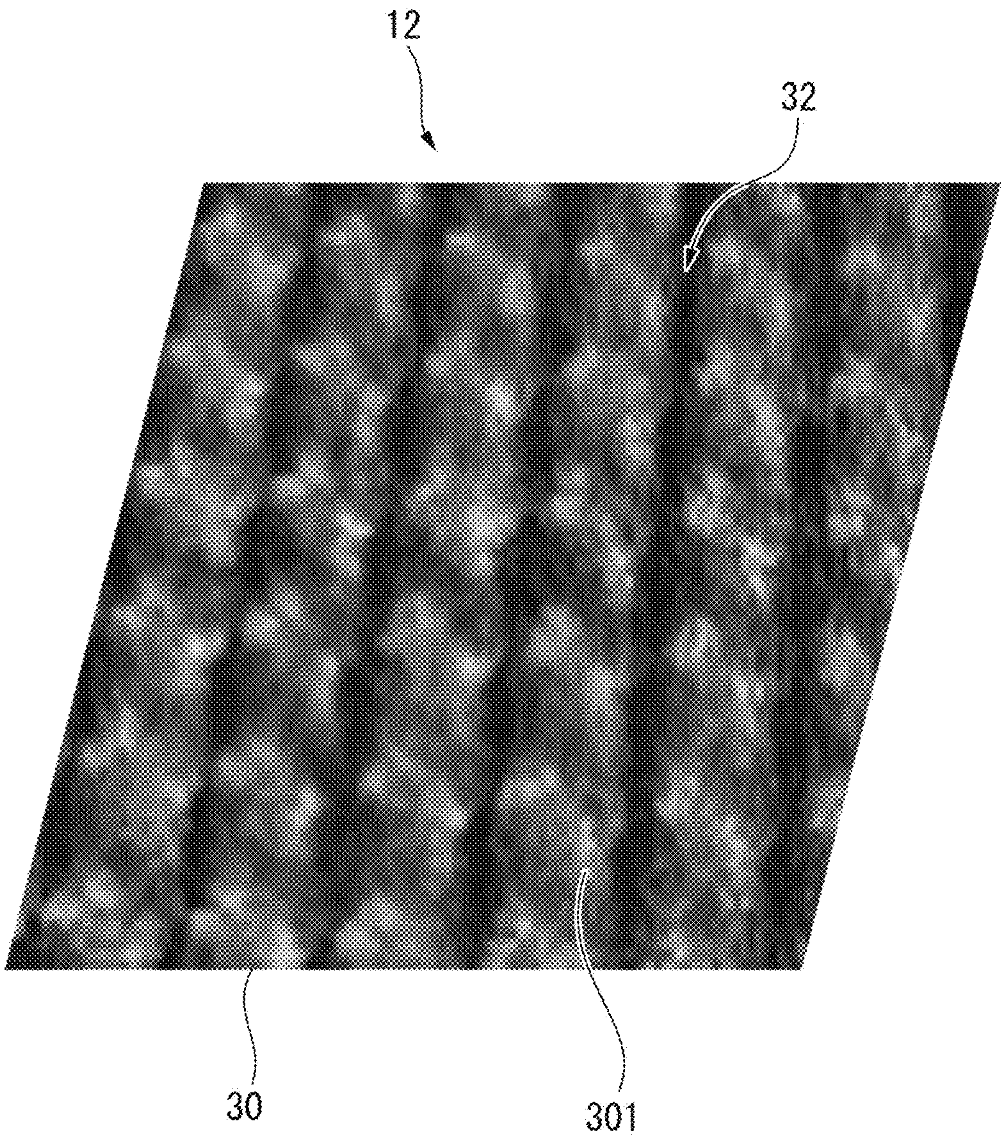
FIG. 4 is an enlarged perspective view illustrating a main part of the hour mark of the first embodiment.

FIG. 2 is a sectional view illustrating a main part of the hour mark 12, FIG. 3 is an enlarged sectional view illustrating a main part of the hour mark 12, and FIG. 4 is an enlarged perspective view illustrating a main part of the hour mark 12. Note that FIGS. 2 and 3 are cross-sectional views taken along a thickness direction of a base material 30 in the hour mark 12.

As illustrated in FIGS. 2 to 4, the hour mark 12 includes the base material 30 and a multilayer film 31. In this embodiment, the base material 30 is entirely covered with the multilayer film 31. Specifically, the multilayer film 31 is stacked to cover the entirety of a surface 301 of the base material 30.

Note that the hour mark 12 is not limited to the above-mentioned configuration, and the multilayer film 31 may be stacked to cover a part of the surface 301 of the base material 30, for example.

Base Material

The material of the base material 30 is composed of metals such as iron, brass and aluminum, resins and the like. Note that in the case where the base material 30 is composed of resin, the resin may be a non-transmissive resin that does not transmit light, or a transmissive resin that transmits light.

Further, in this embodiment, a plurality of recessed portions 32 are formed at the surface 301 of the base material 30 at the hour mark 12. Note that the hour mark 12 is an example of the first region of the present disclosure.

Recessed Portion

When viewed in a cross-sectional view taken along the thickness direction of the base material 30, the recessed portion 32 is defined by a straight side L, and an oblique side D that is tilted with respect to the straight side L and is in contact with the straight side L at the end portion. Further, the straight side L is tilted to be line-symmetric with the oblique side D with respect to a symmetry axis A1 extending in the thickness direction of the base material 30. More specifically, in this embodiment, the recessed portion 32 is formed such that a plurality of conical protrusions are formed at the surface 301 as illustrated in FIG. 4.

Note that the straight side L is an example of the first side of the present disclosure, and the oblique side D is an example of the second side of the present disclosure. In addition, while the depth of the recessed portion 32 is not limited, the depth of the recessed portion 32 is, for example, approximately several tens of micrometers.

Further, in this embodiment, the recessed portion 32 is formed such that the ratio of a length V of the oblique side D with respect to the thickness direction of the base material 30 and the length H of the oblique side D with respect to the direction orthogonal to the thickness direction of the base material 30 is greater than 1:6. Specifically, the recessed portion 32 is formed such that the ratio of V with respect to H is greater than 1/6.

In other words, the recessed portion 32 is formed such that in the case where the length V of the oblique side D with respect to the thickness direction of the base material 30 is set as 1, the length H of the oblique side D with respect to the direction orthogonal to the thickness direction of the base material 30 is smaller than 6, i.e., H is smaller than six times V.

Multilayer Film

The multilayer film 31 includes a color absorption film 311 and a color adjustment film 312, and is stacked on the surface 301 side of the base material 30.

The color absorption film 311 is stacked on the surface 301 side of the base material 30, and is formed of metal. Note that the metal making up the color absorption film 311 is preferably Ag, Pt, Au, Cu, Al, Cr, Sn, Fe, Ti and the like, and their alloys.

In addition, in this embodiment, the color absorption film 311 is composed of a thin film with a thickness with which incident light can be transmitted. In this manner, the dial 10 with a luxurious external appearance can be obtained. Examples of the method of forming the color absorption film 311 include, but not limited to, ion assist vapor deposition, ion plating vapor deposition, vacuum deposition and sputtering.

The color adjustment film 312 is stacked on the surface 301 side of the base material 30. In this embodiment, the color absorption film 311 and the color adjustment film 312 are stacked in this order on the surface 301 of the base material 30. Specifically, the color absorption film 311 is disposed between the surface 301 of the base material 30 and the color adjustment film 312. The color adjustment film 312 adjusts the color tone through optical interference.

In this embodiment, the color adjustment film 312 is composed of a multilayer film including an inorganic film. Specifically, the color adjustment film 312 is configured as a stacked including a plurality of inorganic substance layers 3121.

The inorganic substance layer 3121 is preferably composed of fluorides and/or oxides of inorganic materials, and is preferably composed of a material containing at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$ and $NdF_3$. More preferably, the plurality of inorganic substance layers 3121 are composed of layers composed of materials different from each other selected from the above-mentioned group. In this manner, the range of the color tone expressed as the dial 10 can be increased. Further, since the above-mentioned inorganic oxides have high chemically stability, the stability and durability of the external appearance as the dial 10 can be increased.

Note that the multilayer film 31 is not limited to the above-mentioned configuration. The color adjustment film 312 may be stacked on the surface 301 side of the base material 30, the color absorption film 311 may be stacked on the color adjustment film 312, and the order of the color absorption film 311 and the color adjustment film 312 may be arbitrarily set. Further, the color adjustment film 312 may include a metal thin film.

Note that examples of the method of forming each inorganic substance layer 3121 include, but not limited to, ion assist vapor deposition, ion plating vapor deposition, vacuum deposition and sputtering.

Preferably, the inorganic substance layer 3121 is composed of two or more layers, more preferably three or more layers.

Dial Body Part 11

Figure 5:
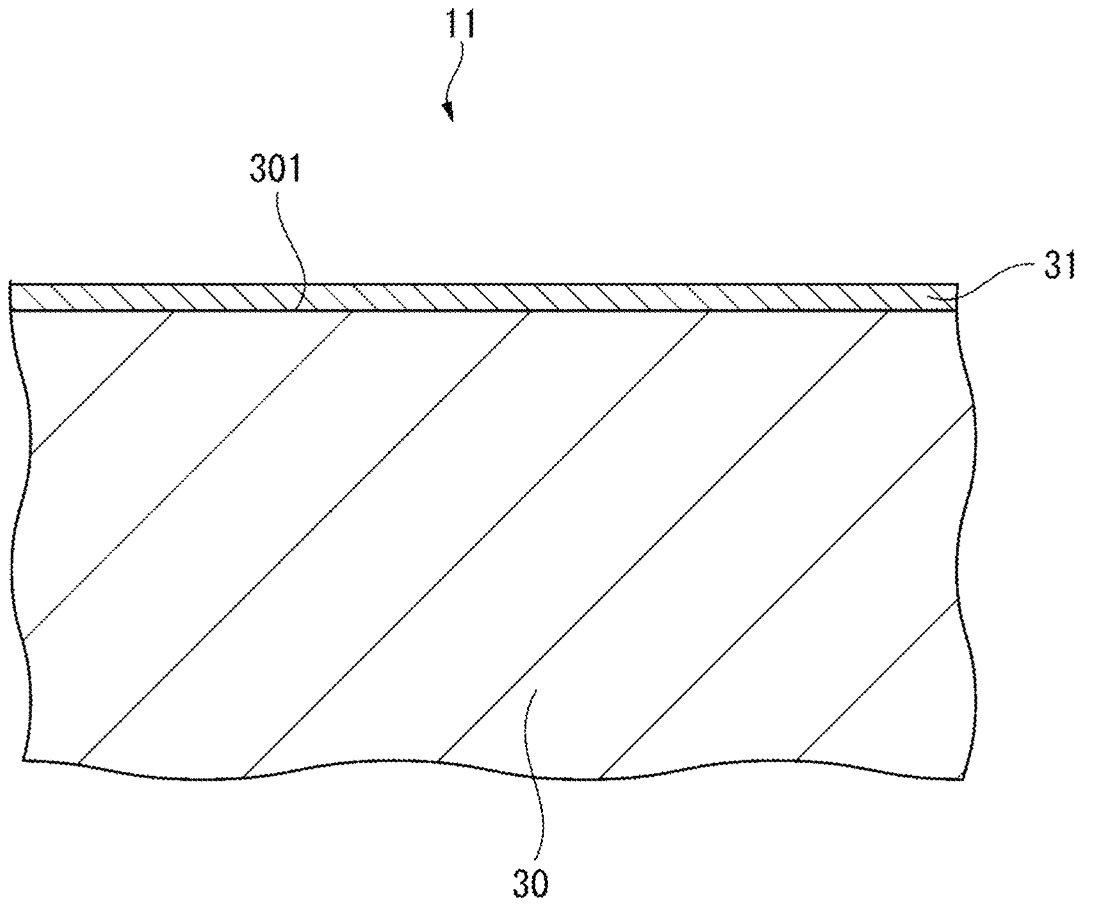
FIG. 5 is a sectional view illustrating a main part of a dial body of the first embodiment.
Figure 6:
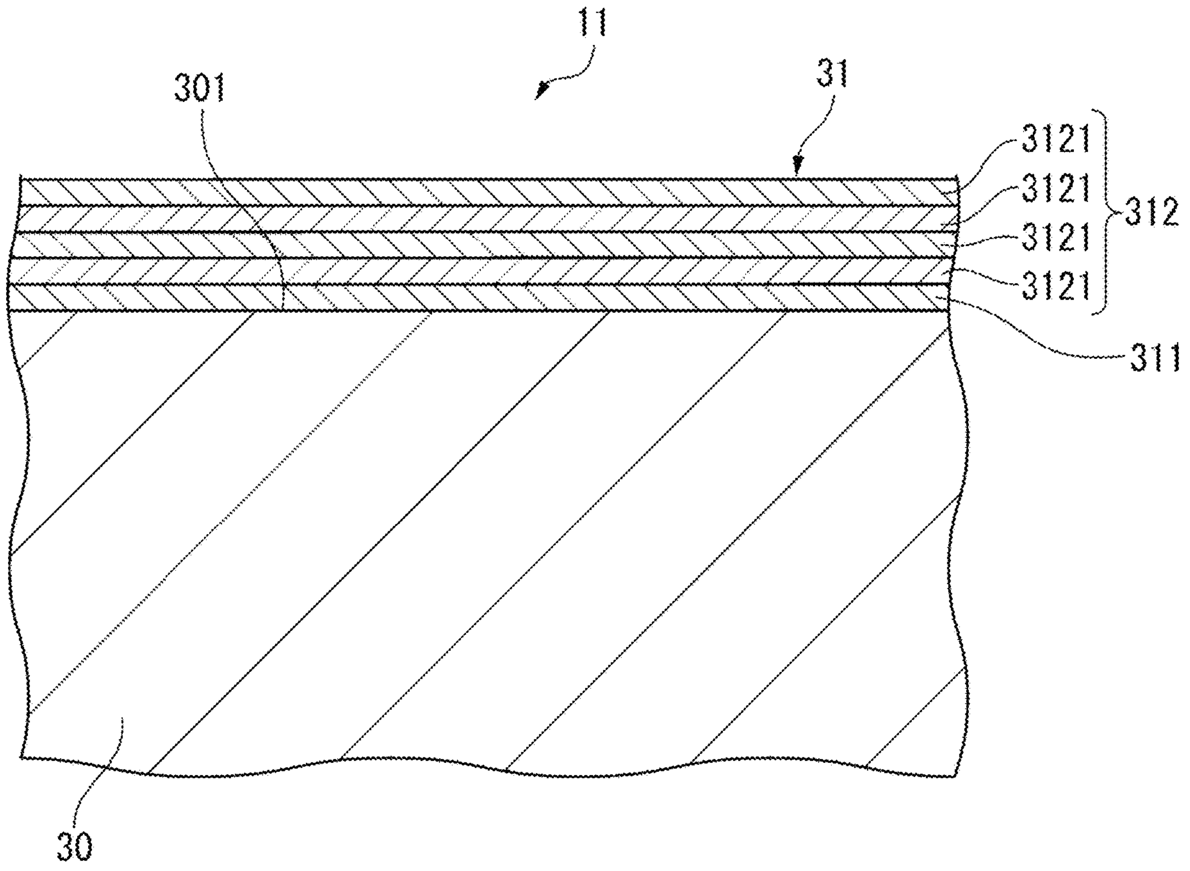
FIG. 6 is an enlarged sectional view illustrating a main part of the dial body of the first embodiment.

FIG. 5 is a sectional view illustrating a main part of the dial body part 11, and FIG. 6 is an enlarged sectional view illustrating a main part of the dial body part 11. Note that FIGS. 5 and 6 are cross-sectional views of the base material 30 in the dial body part 11 taken along a thickness direction.

As illustrated in FIGS. 5 and 6, the dial body part 11 includes the base material 30 and the multilayer film 31 described above.

Further, in this embodiment, the surface 301 of the base material 30 in the dial body part 11 is smooth. Specifically, no recessed portion is formed in the surface 301 of the base material 30 in the dial body part 11. Note that the dial body part 11 is an example of the second region of the present disclosure.

Note that in this embodiment, the state where the surface 301 of the base material 30 in the dial body part 11 is smooth is not limited to a state where the surface 301 is completely smooth, but includes, for example, a state where the surface 301 includes a recessed portion with a depth of approximately 5 μm and/or a recessed portion with a depth of approximately 10 μm, and indicates a state where the recessed portion 32 described above is not formed.

Manufacturing Method for Dial

Next, a manufacturing method for the dial 10 is described.

First, a plurality of the recessed portions 32 are formed in the surface 301 of the base material 30 at a position where the hour mark 12 is provided in the dial 10. For example, in the surface 301 of the base material 30, the recessed portion 32 is formed through processes such as cutting, laser processing, chemical removal, polishing and forging/casting. At this time, a plurality of conical protrusions are formed on the surface 301 by forming the recessed portion 32 such that the ratio of the length V of the oblique side D with respect to the thickness direction of the base material 30 and the length H of the oblique side D with respect to the direction orthogonal to the thickness direction of the base material 30 is greater than 1:6.

Note that the process for forming the recessed portion 32 is not limited.

Next, the multilayer film 31 is stacked on the surface 301 of the base material 30 at the dial body part 11 and the hour mark 12. More specifically, the color absorption film 311 is formed on the surface 301 of the base material 30 through ion assist vapor deposition, ion plating vapor deposition, vacuum deposition, sputtering and the like. Thereafter, the color adjustment film 312 composed of the plurality of inorganic substance layers 3121 is stacked through ion assist vapor deposition, ion plating vapor deposition, vacuum deposition, sputtering and the like. In this manner, the dial 10 can be manufactured.

Further, the watch 1 can be manufactured by using the dial 10 manufactured through the above-described manufacturing method for the watch 1.

In this embodiment, by forming the recessed portion 32 through processes such as cutting, laser processing, chemical removal, polishing and forging/casting, the inclination of the oblique side D in the recessed portion 32 can be arbitrarily changed.

Figure 7:
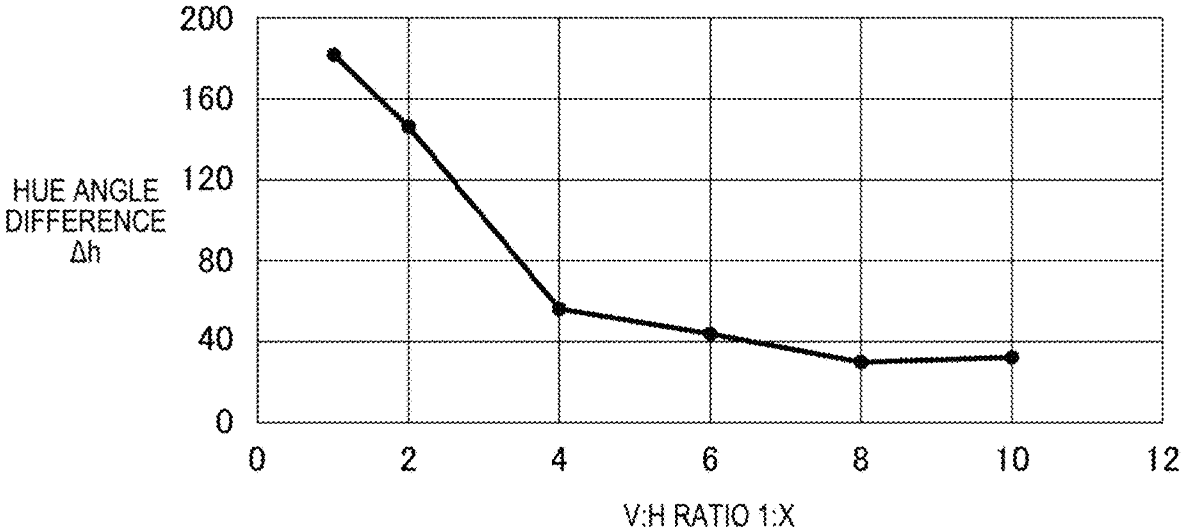
FIG. 7 is a diagram illustrating a relationship between a hue angle and a ratio of a length V of an oblique side in the thickness direction of the base material and a length H of an oblique side in a direction orthogonal to the thickness direction of the base material.

FIG. 7 is a diagram illustrating a relationship between a hue angle and a ratio of the length V of the oblique side in the thickness direction of the base material and the length H of the oblique side in the direction orthogonal to the thickness direction of the base material. In FIG. 7, the hue angle was measured with a recessed portion that is formed in a base material formed of a metal such as iron, brass and aluminum such that a ratio of the length V of the oblique side in the thickness direction of the base material and the length H of the oblique side in the direction orthogonal to the thickness direction of the base material is 1:1 to 1:10, and a multilayer film that is stacked on the surface of the base material. A hue angle difference Δh represents the difference between the hue angle at the position where the recessed portion is formed and the hue angle at the position where the recessed portion is not formed. Note that in the present disclosure, the hue angle is a value determined by a* and b* values in Lab display system defined by Commission Internationale d'Eclairage (CIE).

As illustrated in FIG. 7, it was suggested that as the length ratio of the length V of the oblique side in the thickness direction of the base material with respect to the length H of the oblique side in the direction orthogonal to the thickness direction of the base material increases, the difference Δh in hue angle from the position where the recessed portion is not formed increases. This is presumably due to the fact that the color tone of the light interfered with the multilayer film stacked on the oblique side was changed in accordance with the inclination of the oblique side.

In this manner, in this embodiment, at the hour mark 12 where the plurality of recessed portions are formed, the hue angle of the light interfered with the multilayer film 31 stacked on the oblique side D increases in accordance with the inclination of the oblique side D, whereas at the dial body part 11, the hue angle of the hour mark 12 is greater than the hue angle of the dial body part 11 because the multilayer film 31 is stacked on the smooth surface 301. Thus, the hue can be changed between the hour mark 12 and the dial body part 11 in the dial 10.

In particular, it was suggested that in the case where the ratio of the length V of the oblique side in the thickness direction of the base material and the length H of the oblique side in the direction orthogonal to the thickness direction of the base material is greater than 1:6, i.e., in the case where the length of V with respect to H is greater than 1/6, the difference Δh in hue angle from the position where the recessed portion is not formed is large. In this manner, it was suggested that in this embodiment, by setting the ratio of V and H to a ratio greater than 1:6, it is possible to set a large difference between the hue angle of the hour mark 12 where the recessed portion 32 is formed and the hue angle of the dial body part 11 where the recessed portion is not formed, and set a large change in hue between the hour mark 12 and the dial body part 11. Thus, since the hour mark 12 and the dial body part 11 in the dial 10 can be highly unified while ensuring the visibility of the hour mark 12, the design quality of the dial 10 can be enhanced.

Operational Effects of Embodiment

According to this embodiment described above, the following effects can be achieved.

In this embodiment, the plurality of recessed portions 32 are formed at the surface 301 of the base material 30 at the hour mark 12. Further, when viewed in a cross-sectional view taken along the thickness direction of the base material 30, the plurality of recessed portions 32 are defined by the straight side L and the oblique side D that is tilted with respect to the straight side L and is in contact with the straight side L at the end portion. In this manner, at the hour mark 12, the hue angle of the light interfered with the multilayer film 31 stacked on the oblique side D increases in accordance with the inclination of the oblique side D, whereas at the dial body part 11, the hue angle of the hour mark 12 is greater than the hue angle of the dial body part 11 because the multilayer film 31 is stacked on the smooth surface 301. Thus, the hue can be changed between the hour mark 12 and the dial body part 11 in the dial 10.

In this embodiment, in cross-sectional view, the ratio of the length V of the oblique side D with respect to the thickness direction of the base material and the length H of the oblique side D with respect to the direction orthogonal to the thickness direction is greater than 1:6. In this manner, a large difference between the hue angle of the hour mark 12 where the recessed portion 32 is formed and the hue angle of the dial body part 11 where the recessed portion is not formed can be achieved. Thus, a large change in hue between the hour mark 12 and the dial body part 11 can be achieved.

In this embodiment, the multilayer film 31 may include the color adjustment film 312 composed of a material containing at least one of $Ta_2O_5$, $SiO_2$, $TiO_2$, $Al_2O_3$, $ZrO_2$, $Nb_2O_5$, $HfO_2$, $NasAl_3F_{14}$, $Na_3AlF_6$, $AlF_3$, $MgF_2$, $CaF_2$, $BaF_2$, $YF_3$, $LaF_3$, $CeF_3$ and $NdF_3$. In this manner, the range of the color tone expressed as the dial 10 can be increased. Further, since the above-mentioned inorganic oxides have high chemically stability, the stability and durability of the external appearance as the dial 10 can be increased.

In this embodiment, the multilayer film 31 includes the color absorption film 311 formed of metal. In this manner, the dial 10 with a luxurious external appearance can be obtained.

In this embodiment, in cross-sectional view, the straight side L is tilted to be line-symmetric with the oblique side D with respect to the symmetry axis A1 extending in the thickness direction of the base material 30, and thus the color tone of the light interfered with the multilayer film 31 stacked on the straight side L can be changed as with the light interfered with the multilayer film 31 stacked on the oblique side D.

In this embodiment, the plurality of recessed portions 32 are formed at the surface 301 of the base material 30 of the hour mark 12, and the surface 301 of the dial body part 11 is smooth. Thus, the hour mark 12 and the dial body part 11 in the dial 10 can be highly unified while ensuring the visibility of the hour mark 12. Thus, the design quality of the dial 10 can be enhanced.

In this embodiment, the recessed portion 32 is formed through any of cutting, laser processing, chemical removal, polishing and forging/casting. In this manner, the inclination of the oblique side D in the recessed portion 32 can be arbitrarily changed.

Second Embodiment

Next, a second embodiment of the present disclosure is described with reference to FIGS. 8 to 10. The second embodiment is different from the above-described first embodiment in that a first region 111A and a second region 112A are provided in the dial body part 11.

Note that in the second embodiment, the same or similar components as those of the first embodiment are denoted with the same reference numerals, and the description thereof is omitted or simplified.

Figure 8:
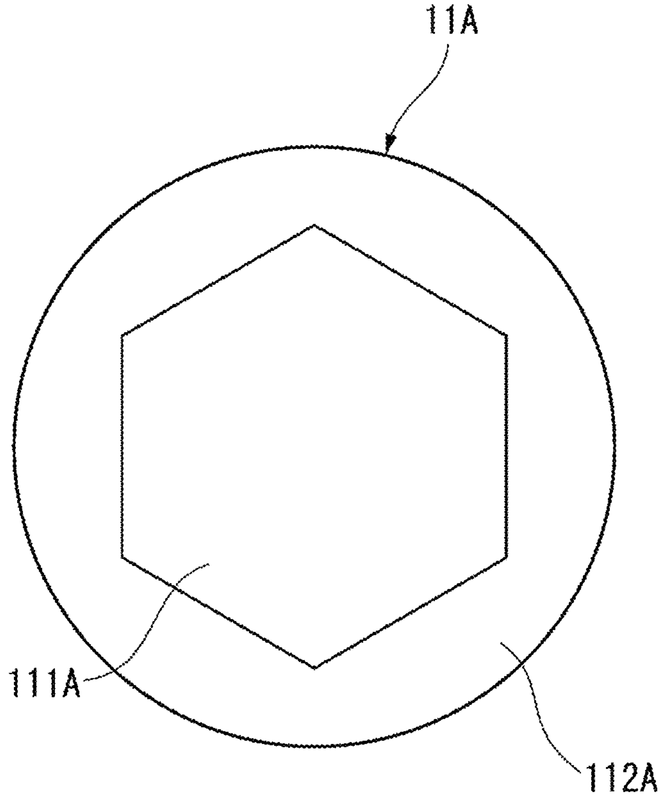
FIG. 8 is a schematic front view illustrating a dial body of a second embodiment.

FIG. 8 is a schematic front view illustrating the dial body part 11.

As illustrated in FIG. 8, in this embodiment, the dial body part 11A includes the first region 111A and the second region 112A that are different from each other in the color to be visually recognized.

First Region

Figure 9:
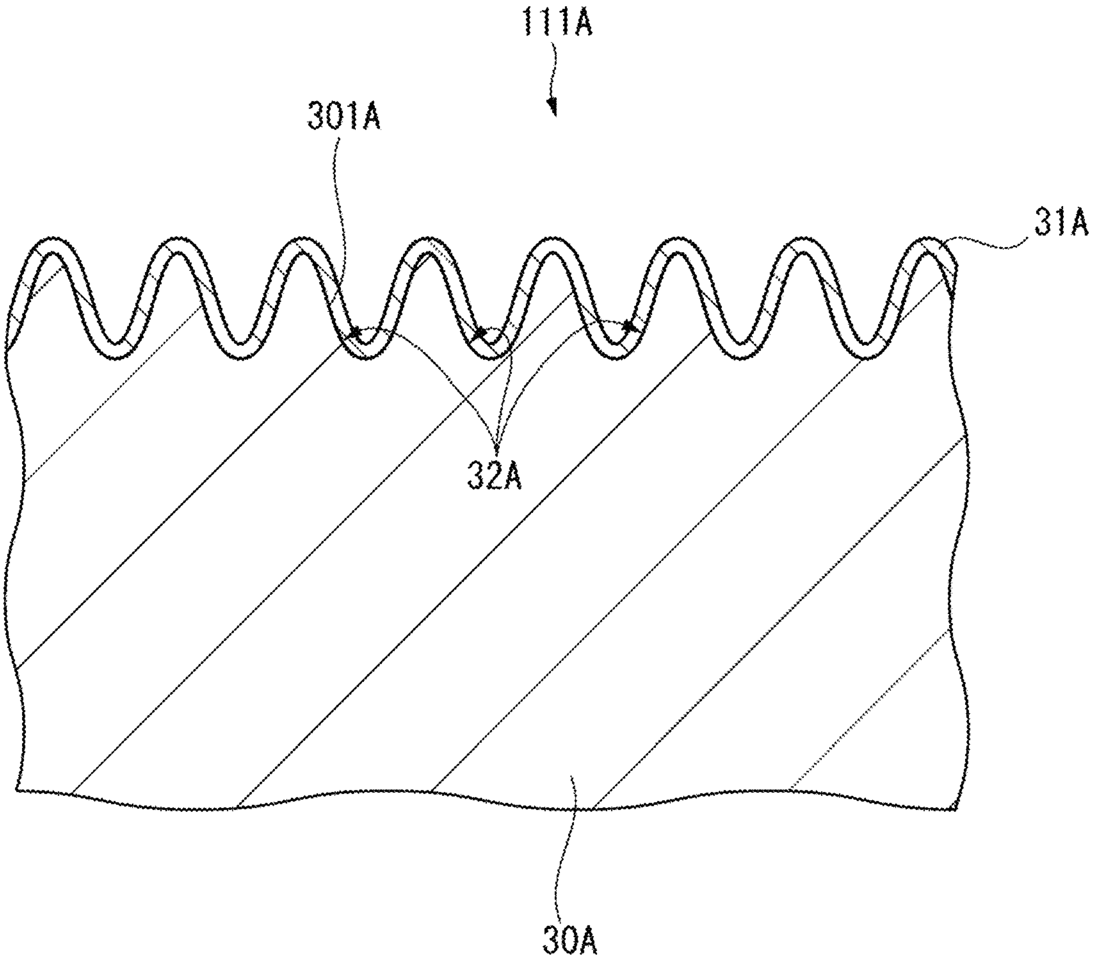
FIG. 9 is a sectional view illustrating a main part of the dial body of the second embodiment.
Figure 10:
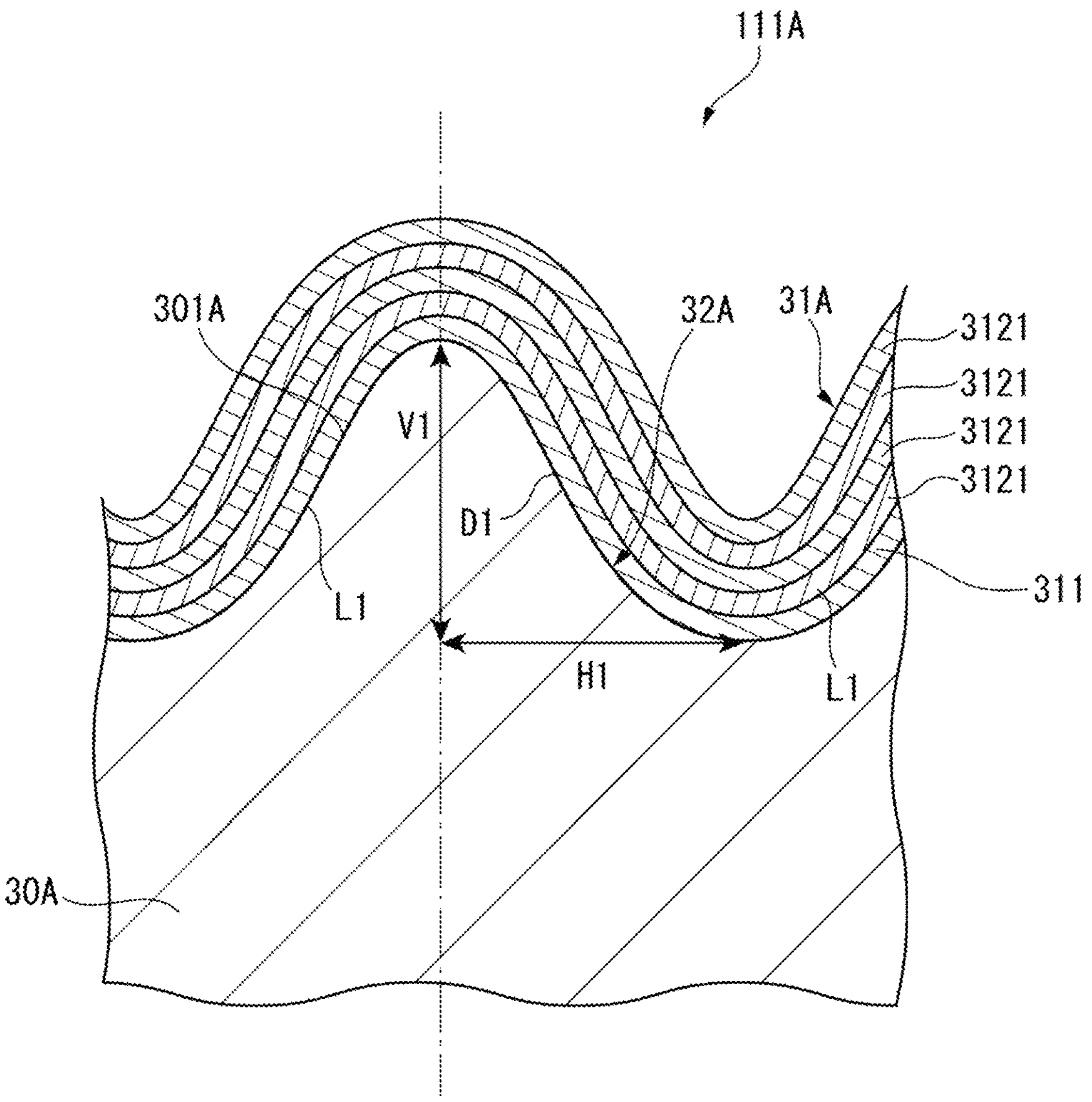
FIG. 10 is an enlarged sectional view illustrating a main part of the dial body of the second embodiment.

FIG. 9 is a sectional view illustrating a main part of the first region 111A, and FIG. 10 is an enlarged sectional view illustrating a main part of the first region 111A. Note that FIGS. 9 and 10 are cross-sectional views taken along a thickness direction of a base material 30A in the first region 111A.

As illustrated in FIGS. 9 and 10, the first region 111A includes the base material 30A and a multilayer film 31A as with the hour mark 12 of the first embodiment described above.

Recessed Portion

When viewed in a cross-section view taken along the thickness direction of the base material 30A, a recessed portion 32A is defined by a first side L1, and a second side D1 that is tilted with respect to the first side L1 and is in contact with the first side L1 at the end portion. Further, in this embodiment, the first side L1 and the second side D1 are curved.

In addition, as in the first embodiment described above, the recessed portion 32A is formed such that a plurality of conical protrusions are formed at a surface 301A.

Further, as in the first embodiment described above, the recessed portion 32A is formed such that the ratio of the length V2 of the second side D1 with respect to the thickness direction of the base material 30A and the length H1 of the second side D1 with respect to the direction orthogonal to the thickness direction of the base material 30A is greater than 1:6. Specifically, the recessed portion 32A is formed such that the ratio of V1 with respect to H1 is greater than 1/6.

Second Region

The second region 112A has the same configuration as that of the dial body part 11 of the first embodiment described above. Specifically, the recessed portion is not formed in the surface 301A of the base material 30A in the second region 112A.

Operational Effects of Second Embodiment

According to this embodiment described above, the following effects can be achieved.

In this embodiment, the first side L1 and the second side D1 that define the recessed portion 32A are curved. In this manner, the sides that define the recessed portion 32A are not limited to a straight line, thus achieving a higher degree of freedom in processing for forming the recessed portion 32A.

Modifications

The present disclosure is not limited to the aforementioned embodiments, and variations, improvements, etc. are included in the present disclosure to the extent that the purposes of the present disclosure can be achieved.

Figure 11:
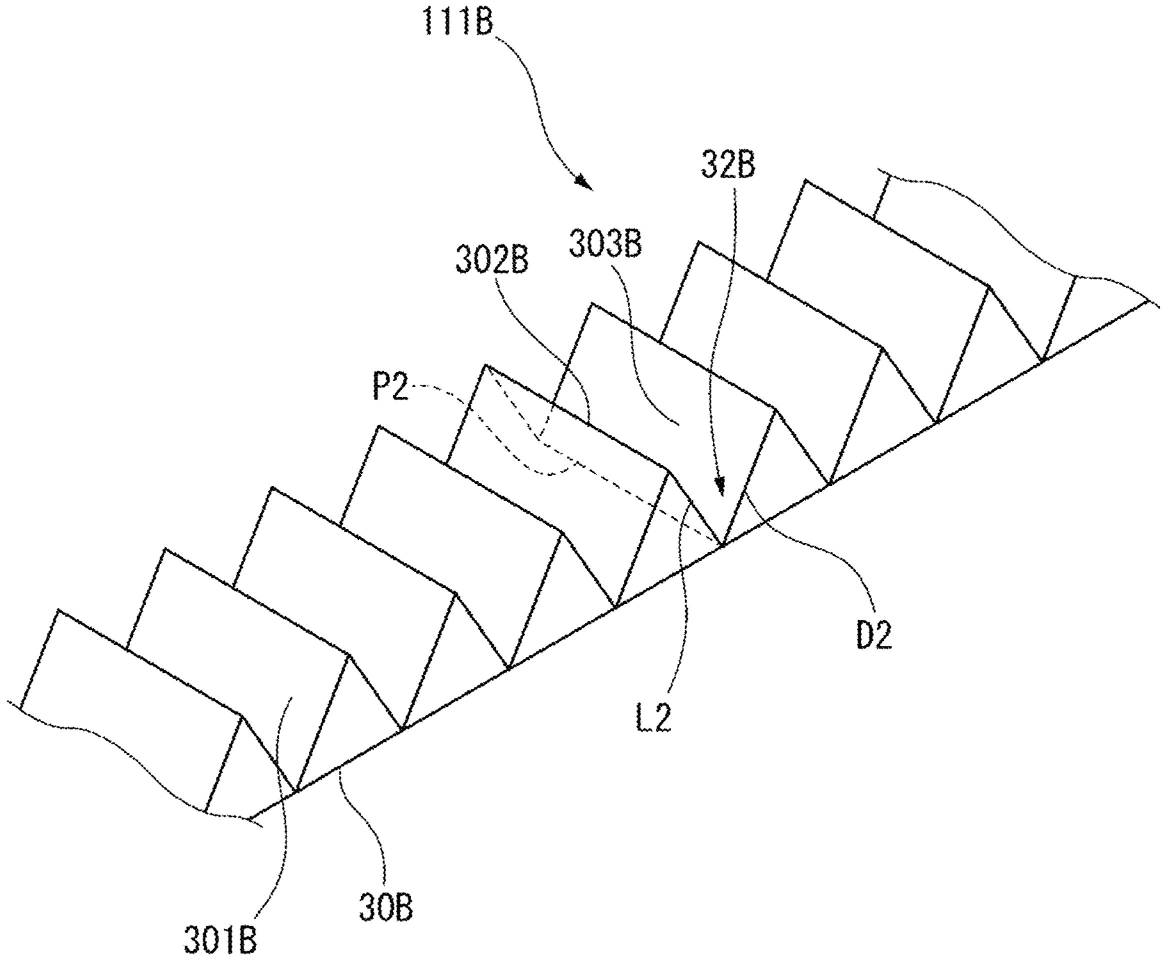
FIG. 11 is a sectional view illustrating a main part of a first region of a modification.

FIG. 11 is a perspective view illustrating a main part of a first region 111B according to a modification.

As illustrated in FIG. 11, in the first region 111B according to the modification, a first surface 302B and a second surface 303B are formed at a surface 301B of a base material 30B. Further, the first surface 302B is defined in a rectangular shape by a first side L2 and a third side P2 orthogonal to the first side L2 and a second side D2. Likewise, the second surface 303B is defined in a rectangular shape by the second side D2 and the third side P2. Further, the angle of the second surface 303B with respect to the first surface 302B is constant.

Further, the recessed portion 32B is defined by the first surface 302B and the second surface 303B defined as described above. Specifically, the surface 301B of the base material 30B is formed in a ridge shape. This configuration makes the processing of the surface 301B of the base material 30B easier. Note that the inclination of the second surface 303B with respect to the first surface 302B can be arbitrarily set.

While the watch component of the present disclosure is configured as the dial 10 in the above-described embodiment, this is not limitative. For example, the watch component of the present disclosure may be configured as any one of a dial ring, a bezel, a movement, a hand and a rotating spindle.

Overview of Present Disclosure

A watch component of the present disclosure includes a base material including a first region having a surface at which a plurality of recessed portions are formed and a second region having a smooth surface, and a multilayer film configured to cover at least a portion of the base material. When viewed in a cross-sectional view taken along a thickness direction of the base material, the plurality of recessed portions are defined by a first side and a second side that is tilted with respect to the first side and is in contact with the first side at an end portion, and a hue angle of the first region is greater than a hue angle of the second region.

In the present disclosure, the plurality of recessed portions are formed at the surface of the first region in the base material. Further, when viewed in the cross-sectional view taken along the thickness direction of the base material, the plurality of recessed portions are defined by the first side and the second side that is tilted with respect to the first side and is in contact with the first side at the end portion. In this manner, in the first region, the hue angle of the light interfered with the multilayer film stacked on the second side increases in accordance with the inclination of the second side, whereas in the second region, the hue angle of the first region is greater than the hue angle of the second region because the multilayer film is stacked on the smooth surface. Thus, the hue can be changed between the first region and the second region in the watch component.

In the watch component of the present disclosure, in the cross-sectional view, a ratio of a length of the second side with respect to the thickness direction of the base material and a length of the second side with respect to a direction orthogonal to the thickness direction is greater than 1:6.

In the watch component of the present disclosure, in the cross-sectional view, a ratio of a length of the second side with respect to the thickness direction of the base material and a length of the second side with respect to a direction orthogonal to the thickness direction is greater than 1:6.

In the watch component of the present disclosure, the multilayer film includes a color adjustment film including a material containing at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$ and $NdF_3$.

In this manner, the range of the color tone expressed as the watch component can be increased. Further, since the above-mentioned inorganic oxides are highly chemically stable, the stability and durability of the external appearance as the watch component can be increased.

In the watch component of the present disclosure, the multilayer film includes a color absorption film formed of metal. In this manner, a luxurious external appearance as a watch component can be achieved.

In the watch component of the present disclosure, in the cross-sectional view, the first side is tilted to be line-symmetric with the second side with respect to a symmetry axis extending in the thickness direction of the base material.

In this manner, since the first side is tilted to be line-symmetric with the second side, the color tone of the light interfered with the multilayer film stacked on the first side can also be changed as with the light interfered with the multilayer film stacked on the second side.

In the watch component of the present disclosure, the recessed portion is defined by the first side, a first surface defined by a third side orthogonal to the first side and the second side, and a second surface defined by the second side and the third side, and an angle of the second surface with respect to the first surface is constant.

In this manner, the surface of the base material is formed in a ridge shape, and thus the ease of the processing on the surface of the base material increases.

In the watch component of the present disclosure, the watch component is configured as a dial, the first region is configured as an hour mark, and the second region is configured as a dial body part.

In this manner, the hour mark and the dial body part in the dial can be highly unified while ensuring the visibility of the hour mark, and thus the design quality of the dial can be enhanced.

A watch of the present disclosure includes the watch component.

A manufacturing method of the present disclosure is a method for a watch component including a base material including a first region having a surface at which a plurality of recessed portions are formed and a second region having a smooth surface, and a multilayer film configured to cover at least a portion of the base material. The manufacturing method includes forming a plurality of recessed portions at the surface of the first region of the base material, and stacking the multilayer film on at least a part of the surface of the base material. When viewed in a cross-sectional view taken along a thickness direction of the base material, the plurality of recessed portions are defined by a first side and a second side that is tilted with respect to the first side and is in contact with the first side at an end portion.

In this manner, in the first region, the hue angle of the light interfered with the multilayer film stacked on the second side increases in accordance with the inclination of the second side, whereas in the second region, the hue angle of the first region is greater than the hue angle of the second region because the multilayer film is stacked on the smooth surface. Thus, the hue can be changed between the first region and the second region in the watch component.

In the manufacturing method of the present disclosure, the recessed portion is formed through any one of cutting, laser processing, chemical removal, polishing and forging/casting.

In this manner, the inclination of the second side in the recessed portion can be arbitrarily changed.

A watch of the present disclosure includes the watch component manufactured through the manufacturing method for the watch component.

What is claimed is:

1. A watch component comprising:

a base material including a first region having a surface at which a plurality of recessed portions are formed and a second region having a smooth surface; and a multilayer film configured to cover each of the first region and the second region, wherein the multilayer film includes a color adjustment film including a material containing at least one of $Na_5Al_3F_{14}$, $Na_3AlF_6$, $AlF_3$, $CaF_2$, $BaF_2$, $YF_3$, $LaF_3$, $CeF_3$, and $NdF_3$, when viewed in a cross-sectional view taken along a thickness direction of the base material, the plurality of recessed portions are defined by a first side and a second side, the second side being tilted with respect to the first side and being in contact with the first side at an end portion, and in the cross-sectional view, a ratio of a length of the second side with respect to the thickness direction of the base material and a length of the second side with respect to a direction orthogonal to the thickness direction is greater than 1:6 such that a hue angle of light interfered with the multilayered film in the first region is greater than a hue angle of light interfered with the multilayered film in the second region.

2. The watch component according to claim 1, wherein the multilayer film includes a color absorption film formed using metal.

3. The watch component according to claim 1, wherein in the cross-sectional view, the first side is tilted to be line-symmetric with the second side with respect to a symmetry axis extending in the thickness direction of the base material.

4. The watch component according to claim 1, wherein the recessed portion is defined by the first side, a first surface, and a second surface, the first surface being defined by a third side orthogonal to the first side and the second side, the second surface being defined by the second side and the third side, and an angle of the second surface with respect to the first surface is constant.

5. The watch component according to claim 1, wherein the watch component is configured as a dial, the first region is configured as an hour mark, and the second region is configured as a dial body part.

6. A watch comprising the watch component according to claim 1.

* * * * *